(12) United States Patent
Suga

(10) Patent No.: US 10,693,990 B2
(45) Date of Patent: Jun. 23, 2020

(54) INFORMATION PROCESSING SYSTEM, METHOD OF DATA TRANSMISSION, AND INFORMATION PROCESSING DEVICE

(71) Applicant: FUJITSU LIMITED, Kawasaki-shi, Kanagawa (JP)

(72) Inventor: Junichi Suga, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 107 days.

(21) Appl. No.: 15/822,841

(22) Filed: Nov. 27, 2017

(65) Prior Publication Data

US 2018/0176321 A1   Jun. 21, 2018

(30) Foreign Application Priority Data

Dec. 19, 2016   (JP) .................................. 2016-245272

(51) Int. Cl.
*H04L 29/08* (2006.01)
*H04L 29/06* (2006.01)

(52) U.S. Cl.
CPC ...... *H04L 67/2842* (2013.01); *H04L 65/1013* (2013.01); *H04L 65/4084* (2013.01); *H04L 65/605* (2013.01); *H04L 65/80* (2013.01)

(58) Field of Classification Search
CPC ............. H04L 67/2842; H04L 65/1013; H04L 65/4084; H04L 65/605; H04L 65/80
See application file for complete search history.

(56) References Cited

U.S. PATENT DOCUMENTS

| 7,921,155 B2 * | 4/2011 | Harrow | H04L 47/10 709/203 |
|---|---|---|---|
| 2003/0065805 A1 * | 4/2003 | Barnes, Jr. | G06Q 10/02 709/231 |
| 2005/0004985 A1 * | 1/2005 | Stochosky | H04L 12/1813 709/205 |
| 2008/0082688 A1 * | 4/2008 | Yi | H04L 67/306 709/246 |
| 2008/0189429 A1 * | 8/2008 | DaCosta | H04L 29/06027 709/231 |

(Continued)

FOREIGN PATENT DOCUMENTS

JP   2006-311013 A   11/2006
JP   2014-035601 A   2/2014

*Primary Examiner* — Uzma Alam
(74) *Attorney, Agent, or Firm* — Arent Fox LLP

(57) ABSTRACT

An information processing system includes a first storage device, a first information processing device including a first processor, and a second information processing device including a second processor, wherein the first processor is configured to receive a first request requesting data, transmit the first request to a third information processing device, store the data in the first storage device, and notify the second information processing device of information indicating that the data is stored, the second processor is configured to receive a second request requesting the data, and transmit the second request of which the destination is changed to the first information processing device, the first processor is configured to transmit the data stored in the first storage device to the second information processing device, based on the second request, and the second processor is configured to transmit the data as a response to the second request.

20 Claims, 13 Drawing Sheets

| CONTENT ID | CACHE SERVER ID |
|---|---|
| aa | AA |
| ⋮ | ⋮ |

(56) References Cited

U.S. PATENT DOCUMENTS

| | | | |
|---|---|---|---|
| 2013/0132544 A1* | 5/2013 | Krishnan | H04L 67/2814 709/223 |
| 2014/0219179 A1* | 8/2014 | Zakrzewski | H04L 49/15 370/328 |
| 2015/0012615 A1* | 1/2015 | Li | H04L 65/60 709/219 |

* cited by examiner

FIG. 4

| CONTENT ID |
|---|
| aa |
| ⋮ |

FIG. 5

| CONTENT ID | CACHE SERVER ID |
|---|---|
| aa | AA |
| ⋮ | ⋮ |

FIG. 11

| CACHE SERVER | IP ADDRESS | FIRST BANDWIDTH | FIRST SIGNAL TRANSMISSION DELAY |
|---|---|---|---|
| BB | xxx.xxx.x.1 | 1.5Gbps | 0.2ms |
| CC | xxx.xxx.x.2 | 800Mbps | 0.3ms |
| ⋮ | ⋮ | ⋮ | ⋮ |

FIG. 13

| CACHE SERVER ID | IP ADDRESS | FIRST BANDWIDTH | FIRST SIGNAL TRANSMISSION DELAY | SECOND BANDWIDTH | SECOND SIGNAL TRANSMISSION DELAY |
|---|---|---|---|---|---|
| BB | xxx.xxx.x.1 | 1.5Gbps | 0.2ms | 1.8Gbps | 0.15ms |
| CC | xxx.xxx.x.2 | 800Mbps | 0.3ms | 1.2Gbps | 0.2ms |
| ... | ... | ... | ... | ... | ... | though a network. In this case, it is
INFORMATION PROCESSING SYSTEM, METHOD OF DATA TRANSMISSION, AND INFORMATION PROCESSING DEVICE

CROSS-REFERENCE TO RELATED APPLICATION

This application is based upon and claims the benefit of priority of the prior Japanese Patent Application No. 2016-245272, filed on Dec. 19, 2016, the entire contents of which are incorporated herein by reference.

FIELD

The present disclosure relates to an information processing system, a method of data transmission, and an information processing device.

BACKGROUND

Content data is downloaded from an information processing device such as a content server that holds the content data such as streaming video to a terminal device of a smartphone or the like through a network. In this case, it is demanded to shorten a time demanded to download and to decrease traffic on the network. For these requirements, a technology has been proposed in which a cache server is provided on a base station or a higher network side of the base station wirelessly coupled to the terminal device. According to this technology, the content data transmitted from the content server to the terminal device through the base station is stored (cached) in the cache server. In a case where a request for the same content is subsequently made from the terminal device, the cache server transmits the content data to the terminal device instead of the content server. In this case, the request is not transmitted to the content server. With this, it is possible to shorten the time demanded for the terminal device to acquire the content data after requesting the content from the terminal device. In addition, it is possible to reduce traffic on the network.

In a network including a plurality of cache servers, a related art in which a first cache server transmits the content data held by itself to another second cache server is known. In this related art, in a case where the second cache server receives a content request (content transmission request) from the terminal device, the second cache server obtains the content data from the first cache server, and can transmit the obtained content data to the terminal device instead of the content server. In order to realize this process, the second cache server issues an inquiry about whether or not the first cache server holds the content data which is a target of the request. In a case where the first cache server holds the content data which is the target of the request of the content request, the first cache server transmits target content data to the second cache server. In this specification, there is a case where content which is a request target of the content request is referred to as "target content". In addition, there is a case where the content data which is the target of the request of the content request is referred to as the "target content data". As the related arts, there are Japanese Laid-open Patent Publication No. 2006-311013 and Japanese Laid-open Patent Publication No. 2014-35601.

SUMMARY

According to one aspect of the invention, an information processing system includes a first storage device, a first information processing device coupled to the first storage device and including a first memory and a first processor coupled to the first memory, and a second information processing device including a second memory and a second processor coupled to the second memory, wherein the first processor is configured to receive a first request requesting data, transmit the first request to a third information processing device, receive the data from the third information processing device, store the data in the first storage device, and notify the second information processing device of information indicating that the data is stored in the first storage device, the second processor is configured to receive a second request requesting the data, change a destination of the second request to the first information processing device based on the information, and transmit the second request of which the destination is changed to the first information processing device, the first processor is configured to transmit the data stored in the first storage device to the second information processing device, based on the second request, and the second processor is configured to transmit the data received from the first information processing device as a response to the second request.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a stored content information table in the first example.

FIG. 5 is a diagram illustrating an example of a notification information table in the first example.

FIG. 11 is a diagram illustrating an example of a link information table in the second example.

FIG. 13 is a diagram illustrating an example of a link information table in a modification example of the second example.

DESCRIPTION OF EMBODIMENTS

In the above-described related art, the second cache server performs the inquiry about whether or not the first cache server holds the target content data of the content request in the first cache server before performing the content request transmission to the content server. In a case where the first cache server does not hold the target content data, the first cache server replies to the second cache server that the first cache server does not hold the content data. Base on the reply, the second cache server transmits the content request to the content server. Therefore, in a case where the first cache server does not hold the content data, a delay occurs in accessing for the content server in the second cache server.

First Example

In a first example, an information processing system including an information processing device, for example, a first cache server including a storage device and another information processing device, for example, a second cache server is disclosed. A terminal device, for example, a smartphone transmits a transmission request of content data to the information processing device, for example, a content server address. This transmission request is transmitted to the first cache server corresponding to the base station through a base station wirelessly coupled to the terminal device. The first cache server obtains the content data from the content server by transmitting the transmission request to the content server, and stores the obtained content data in the storage device. Furthermore, the first cache server notifies the second cache server of information relating to data holding, for example, information (hereinafter, notification information) indicating that the content data is stored in the storage device. Accordingly, in a case where the second cache server receives the transmission request of the content data from the terminal device, based on the notification information notified from the first cache server, it is determined whether the transmission request is transmitted to the content server or transmitted to the first cache server. In a case where the target content data of the transmission request is the same as the content data specified in the notification information, the second cache server transmits the transmission request to the first cache server. Meanwhile, in a case where the notification information corresponding to the target content data of the transmission request is not received from the first cache server, the second cache server transmits the transmission request to the content server.

Figure 1:
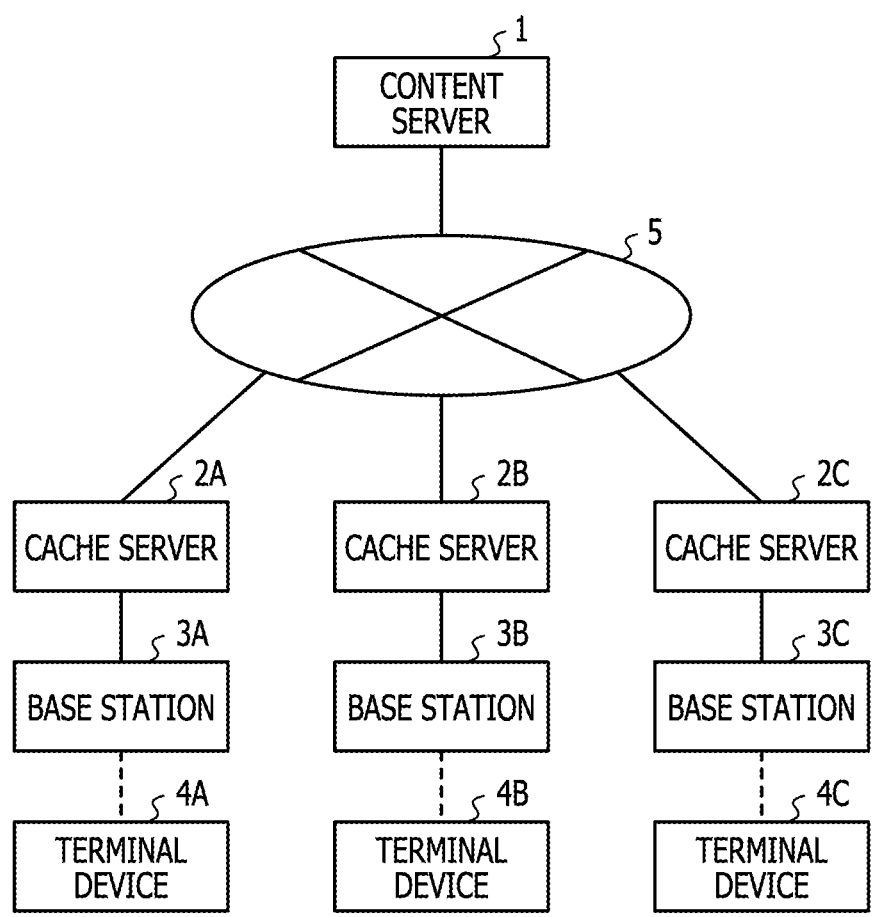
FIG. 1 is a diagram illustrating a configuration example of a network in a first example.

FIG. 1 is a diagram illustrating a configuration example of a network in the first example. In FIG. 1, terminal devices 4A, 4B, and 4C are coupled wirelessly to base stations 3A, 3B, and 3C, respectively. Cache servers 2A, 2B, and 2C are coupled to the base stations 3A, 3B, and 3C, respectively. In an example illustrated in FIG. 1, the cache servers 2A, 2B, and 2C are configured separately from the base stations 3A, 3B, and 3C, respectively, on a network 5 side. However, the cache servers 2A, 2B, and 2C may be configured to be integrated with the base stations 3A, 3B, and 3C. Each of the cache servers 2A, 2B, and 2C can include a storage device, and store the content data therein. Each of the cache servers 2A, 2B, and 2C is coupled to a content server 1 through the network 5.

In the following description, it is assumed that the plurality of cache servers 2A, 2B, and 2C disclosed in FIG. 1 are denoted as a "cache server 2" in a case where the cache servers are not distinguished from each other. Similarly, it is assumed that the base stations 3A, 3B, and 3C, and the terminal devices 4A, 4B, and 4C are denoted as a "base station 3" and a "terminal device 4" in a case where they are not distinguished from each other. In addition, in the first example and a second example disclosed below, it is described that the cache server 2A is the cache server of a side which transmits the notification information, and the cache servers 2B and 2C are the cache servers of a side which receives the notification information.

In FIG. 1, the cache server 2A obtains the content data from the content server 1. Accordingly, the content data is stored in the storage device of the cache server 2A. In this case, the notification information indicating that the cache server 2A holds the content data is notified to other cache servers 2. The notification information includes an identifier (ID) (hereinafter, content ID) for specifying content, for example, a uniform resource identifier (URI) and an ID (hereinafter, cache server ID) for specifying the cache server 2A that holds the content data. Other cache servers 2 receive the notification information, and register the notification information in the notification information table. The notification information table is a table that holds a result obtained by associating the content ID and the cache server ID each other included in the notification information. The detail of the notification information table will be described below.

In a case where other cache servers 2 receive a content request from the terminal device 4, other cache servers 2 refer to the notification information table. With this, other cache servers 2 can determine whether or not the target content data of the content request is held by the cache server 2A. In a case where it is determined that the target content data is held by the cache server 2A, other cache servers 2 transmit the content request to the cache server 2A, obtain the content data from the cache server 2A, and transmit the obtained content data to the terminal device 4. Meanwhile, in a case where it is determined that the target content data is not held by the cache server 2A, other cache servers 2 transmit the content request to the content server 1, obtain the content data from the content server 1, and transmit the obtained content data to the terminal device 4.

As described above, in a case where the cache server 2A stores the content data, the notification information is transmitted to other cache servers 2. With this, when receiving the content request, other cache servers 2 can determine whether the content request is transmitted to the cache server 2A or transmitted to the content server 1 without performing an inquiry about whether or not the target content data is held with respect to the cache server 2A.

Figure 2C:
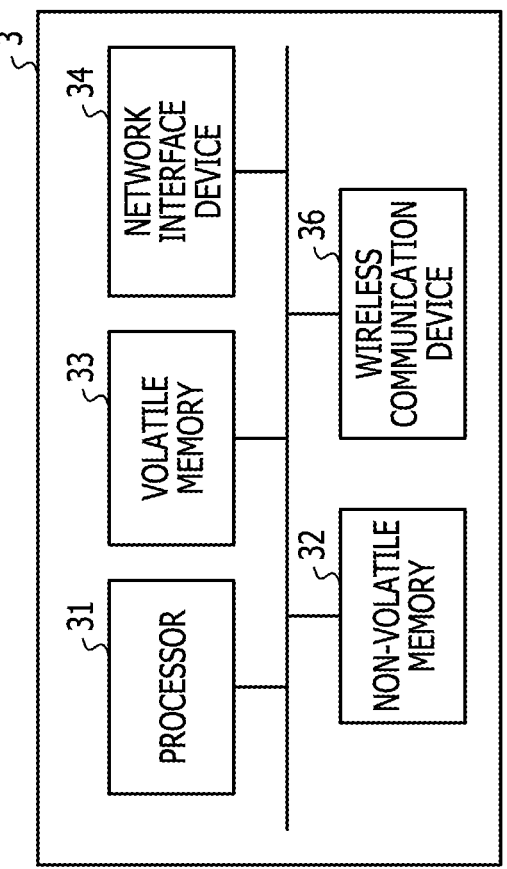
FIGS. 2A, 2B, 2C, and 2D are hardware configuration diagrams of a content server, a cache server, a base station, and a terminal device in the first example, respectively.
Figure 2D:
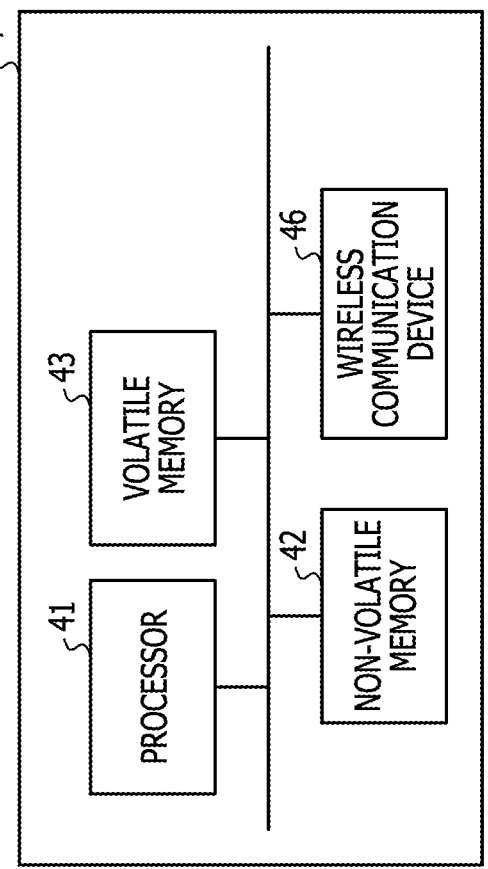
Figure 2A:
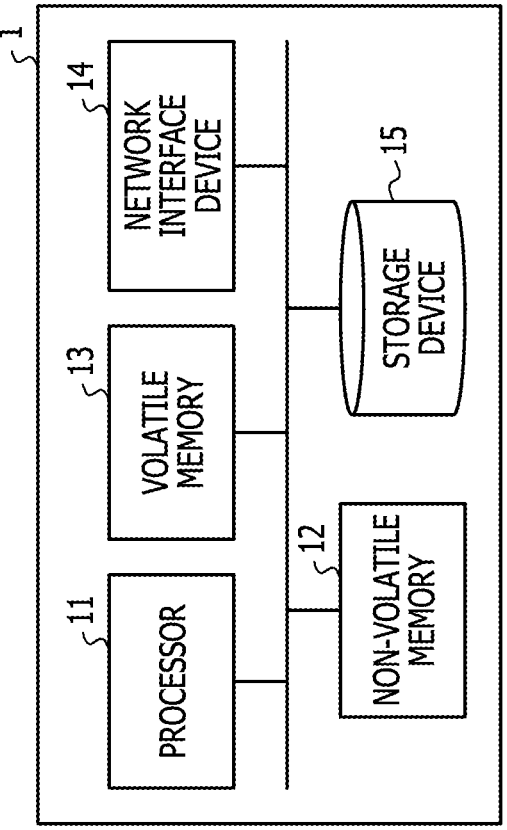

FIGS. 2A, 2B, 2C, and 2D are hardware configuration diagrams of the content server 1, the cache server 2, the base station 3, and the terminal device 4 in the first example, respectively. FIG. 2A illustrates a hardware configuration of the content server 1. The content server 1 includes a processor 11, a non-volatile memory 12, a volatile memory 13, a network interface device 14, and a storage device 15. The processor 11 executes a computer program by loading the computer program stored in the non-volatile memory 12 in the volatile memory 13. The processor 11 is a hardware processor, and a central processing unit (CPU), a micro control unit (MCU), a micro processing unit (MPU), a digital signal processor (DSP), a field programmable gate array (FPGA), or the like can be applied thereto.

A computer program and the like executed by the processor 11 are stored in the non-volatile memory 12. For example, the non-volatile memory 12 is a read only memory (ROM), a mask read only memory (mask ROM), a programmable read only memory (PROM), a flash memory, a magnetoresistive random access memory (MRAM), a resistance random access memory (ReRAM), a ferroelectric random access memory (FeRAM), and the like. The computer program is a storage medium rather than the non-volatile memory 12, and can be recorded in a computer readable recording medium (however, excluding carrier wave). In addition, a portable recording medium such as a digital versatile disc (DVD) and a compact disc read only memory (CD-ROM) in which a computer program is recorded can also be distributed. In addition, the computer program is transmitted through the network 5.

The computer program stored in the non-volatile memory 12 is loaded in the volatile memory 13. In addition, data used for calculation processing, data that is a result of the calculation processing, or the like by the processor 11 is held in the volatile memory 13. For example, the volatile memory 13 is a static random access memory (SRAM), a dynamic random access memory (DRAM), or the like. Also, the content server 1 may not include the volatile memory 13. In this case, the processor 11 directly executes the computer program stored in the non-volatile memory 12.

The network interface device 14 is coupled to the network 5, and receives the content request, or transmits the content data. For example, the network interface device 14 is a network interface card (NIC). The content data is stored in the storage device 15 and the content data is distributed to the storage device 15 in response to the content request from the terminal device 4. For example, the storage device 15 is a solid state drive (SSD) or a hard disk drive (HDD).

Figure 2B:
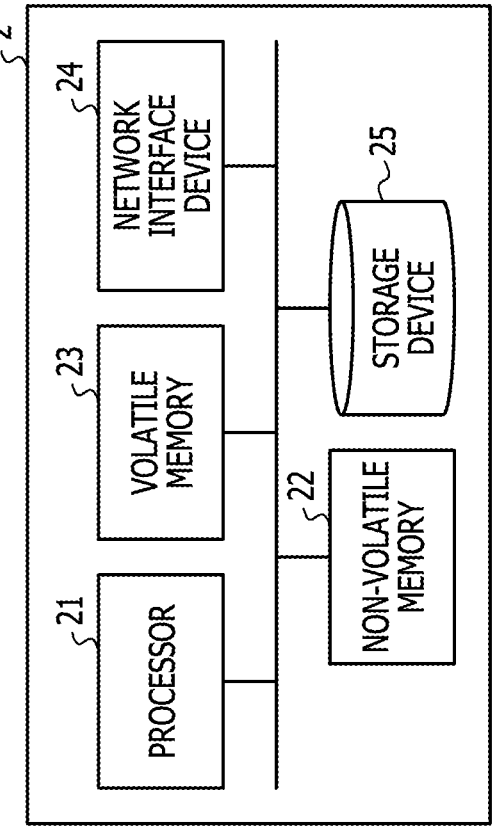

FIG. 2B illustrates a hardware configuration of the cache server 2. Content overlapped with the content described already in FIG. 2A will be appropriately omitted. The cache server 2 includes a processor 21, a non-volatile memory 22, a volatile memory 23, a network interface device 24, and a storage device 25. The processor 21 executes a computer program by loading the computer program stored in the non-volatile memory 22 in the volatile memory 23. The processor 21 is the hardware processor. The computer program or the like executed by the processor 21 is stored in the non-volatile memory 22. The computer program stored in the non-volatile memory 22 is loaded in the volatile memory 23. In addition, the data used for calculation processing, the data that is a result of the calculation processing, or the like by the processor 21 is held in the volatile memory 23. The network interface device 24 is coupled to the network 5, and performs the transmission and reception of the content request, and the transmission and reception of the content data. Also, the cache server 2 is coupled to the base station 3 through the network interface device 24. The content data is stored in the storage device 25.

FIG. 2C illustrates a hardware configuration of the base station 3. Content overlapped with the content described already in FIGS. 2A and 2B will be appropriately omitted. The base station 3 includes a processor 31, a non-volatile memory 32, a volatile memory 33, a network interface device 34, and a wireless communication device 36. The processor 31 executes a computer program by loading the computer program stored in the non-volatile memory 32 in the volatile memory 33. The processor 31 is a hardware processor. A computer program or the like executed by the processor 31 is stored in the non-volatile memory 32. The computer program stored in the non-volatile memory 32 is loaded in the volatile memory 33. In addition, the data used for calculation processing, the data that is a result of the calculation processing, or the like by the processor 31 is held in the volatile memory 33. The network interface device 34 is coupled to the cache server 2, and performs the transmission and reception of the content request, and the transmission and reception of the content data. For example, the wireless communication device 36 is a communication module of long term evolution (LTE), third generation (3G), or wireless local area network (WLAN), performs wireless communication with the terminal device 4, receives the content request from the terminal device 4, and transmits the content data to the terminal device 4.

FIG. 2D illustrates a hardware configuration of the terminal device 4. Content overlapped with the content described already in FIGS. 2A, 2B, and 2C will be appropriately omitted. The terminal device 4 includes a processor 41, a non-volatile memory 42, a volatile memory 43, and a wireless communication device 46. The processor 41 executes a computer program by loading the computer program stored in the non-volatile memory 42 in the volatile memory 43. The processor 41 is a hardware processor. A computer program or the like executed by the processor 41 is stored in the non-volatile memory 42. The computer program stored in the non-volatile memory 42 is loaded in the volatile memory 43. In addition, the data used for calculation processing, the data that is a result of the calculation processing, or the like by the processor 41 is held in the volatile memory 43. The wireless communication device 46 performs the wireless communication with the base station 3, and performs the transmission of the content request, and the reception of the content data.

Figure 3:
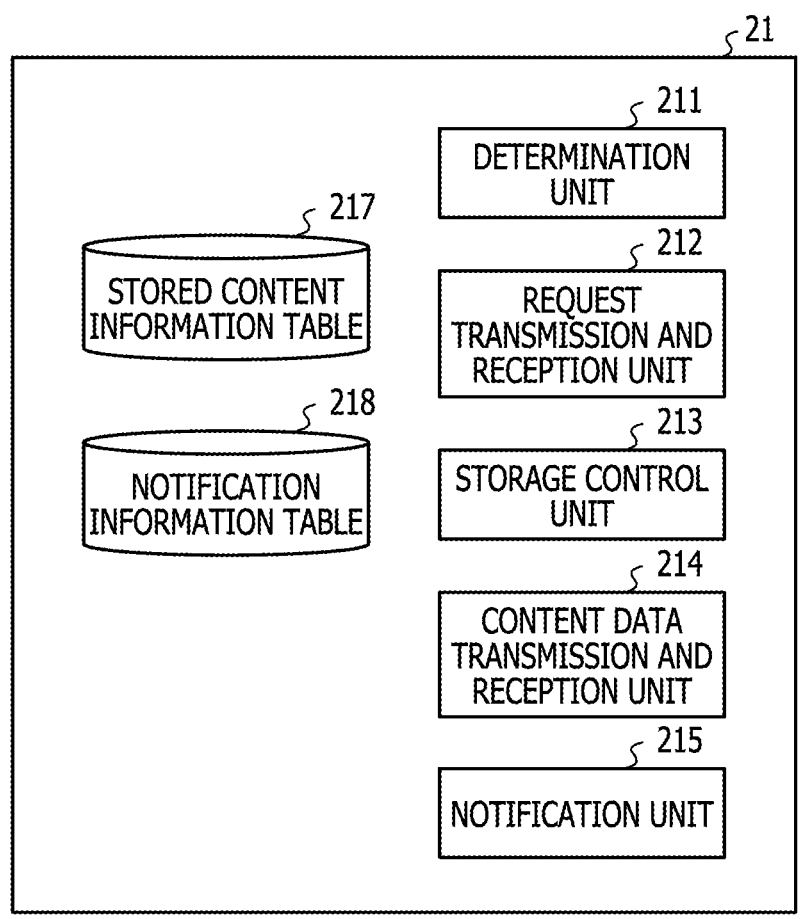
FIG. 3 is a functional block diagram of a processor of the cache server in the first example.

FIG. 3 is a functional block diagram of the processor 21 of the cache server 2 in the first example. The processor 21 executes the computer program stored in the non-volatile memory 22 of FIG. 2, and thus functions as a determination unit 211, a request transmission and reception unit 212, a storage control unit 213, a content data transmission and reception unit 214, a notification unit 215, a stored content information table 217, and a notification information table 218. The stored content information table 217 and the notification information table 218 may be a configuration to be stored in, for example, the volatile memory 23 of FIG. 2.

The determination unit 211 determines whether or not the received target content data of the content request is stored in the storage device 25 of FIG. 2. This determination is performed by referring to the stored content information table 217.

Figure 4:
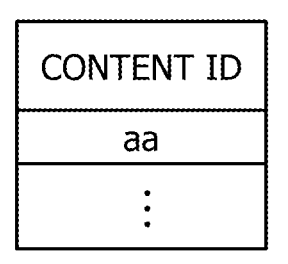

FIG. 4 is a diagram illustrating an example of the stored content information table 217 in the first example. The content ID of the content data held in the storage device 25 of each cache server 2 in FIG. 2 is registered in the stored content information table 217. For example, in a case where the content data of content in which the content ID is "aa" is stored in the storage device 25 of the cache server 2A of itself, the stored content information table 217 of the cache server 2A becomes the content illustrated in FIG. 4.

Returning of description of FIG. 3, in a case where the target content data of the content request is not stored in the stored content information table 217, the determination unit 211 determines whether or not the target content data is stored in other cache servers 2. This determination is performed by referring to the notification information table 218.

Figure 5:
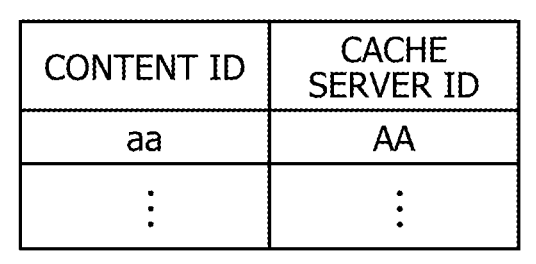

FIG. 5 is a diagram illustrating an example of the notification information table 218 in the first example. A result obtained by associating the content ID and the cache server ID is registered in the notification information table 218. In an example illustrated in FIG. 5, a result obtained by associating the cache server ID of the cache server 2A "AA" and the content ID "aa" of the content data stored in the storage device 25 of the cache server 2A is registered. This corresponds to content of the notification information table 218 of the cache server 2B in a case where, for example, the cache server 2B receives the notification information indicating that the content data of content in which the content ID is "aa" is held in the cache server 2A.

Returning to description of FIG. 3, the request transmission and reception unit 212 receives the content request. In addition, in a case where a content ID of the target content is not registered in the stored content information table 217 and the content ID of the target content is also not registered in the notification information table 218, the request transmission and reception unit 212 transmits the content request to the content server 1. In addition, in a case where the content ID of the target content is not registered in the stored content information table 217, but the content ID of the target content is registered in the notification information table 218, the request transmission and reception unit 212 transmits the content request to the cache server 2 holding the content data.

The content data transmission and reception unit 214 receives the content data transmitted from the content server 1 or other cache servers 2. The storage control unit 213 stores the content data transmitted from the content server 1 in the storage device 25. The content data transmission and reception unit 214 transmits the content data stored in the storage device 25 or the content data received from other cache servers 2 to the terminal device 4 that is an issuing source of the content request. In a case where the content data transmitted from the content server 1 is stored in the storage device 25, the notification unit 215 performs the transmission of the notification information to other cache servers 2.

Figure 6:
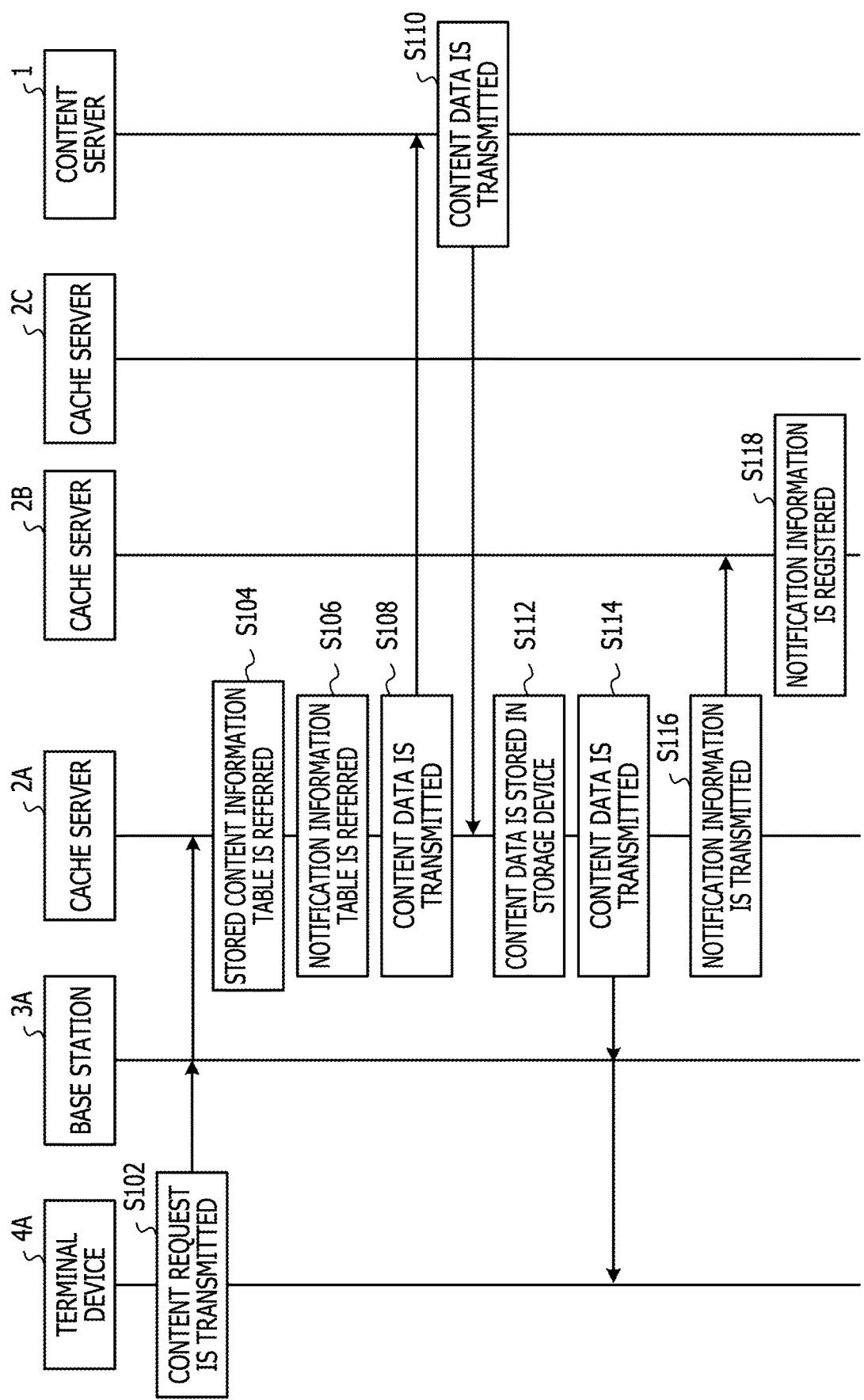
FIG. 6 is a diagram illustrating an outline of a process mainly performed between a plurality of cache servers and the content server in the first example.

FIG. 6 is a diagram illustrating an outline of a process mainly performed between the plurality of cache servers 2 and the content server 1 in the first example. In FIG. 6, a process in which the cache server 2A that receives the content data from the content server 1 transmits the notification information to the cache server 2B, and the cache server 2B stores the notification information in the notification information table 218, is mainly disclosed.

In a process S102, the terminal device 4A transmits the content request to the content server 1 by using wireless communication link formed between the terminal device 4A and the base station 3A. There are cases of both a case where a destination of the content request transmitted from the terminal device 4A is the content server 1 and a case where the destination is the cache server 2A. For example, information indicating the destination of the content request is registered in a packet header including the content request. The content request is transmitted to the cache server 2A through the base station 3A. In a process S104, the cache server 2A determines whether or not the content ID of the target content of the content request is registered in the stored content information table 217. Also, in an example illustrated in FIG. 6, it is assumed that the content ID of the target content is not registered in the stored content information table 217.

Next, in a process S106, the cache server 2A determines whether or not the content ID of the target content is registered in the notification information table 218. In this example, it is assumed that the content ID of the target content is not registered in the notification information table 218.

Next, in a process S108, since the content ID of the target content is not registered in the notification information table 218, the cache server 2A transmits the content request to the content server 1. Here, in a case where the destination of the content request is the cache server 2A, an address of the information indicating the destination of the content request is changed from an address of the cache server 2A to an address of the content server. In a process S110, the content server 1 transmits the content data to the cache server 2A in response to the content request. In a process S112, the cache server 2A stores the content data transmitted from the content server 1 in the storage device 25. In a process S114, the cache server 2A transmits the content data to the terminal device 4A through the base station 3A. In a process S116, the cache server 2A transmits the notification information to the cache server 2B. In a process S118, the cache server 2B receives the notification information, and registers the content of the notification information in the notification information table 218 of itself. The process S116 may be performed between the process S112 and the process S114.

Also, in the process S116, the cache server 2A may perform a process for specifying the cache server 2 to be a transmission target of the notification information. The process for specifying the cache server 2 to be the transmission target will be described below. In FIG. 6, an example in which the cache server 2B is selected as the transmission target of the notification information, and the cache server 2C is not selected as the transmission target of the notification information is disclosed.

Figure 7:
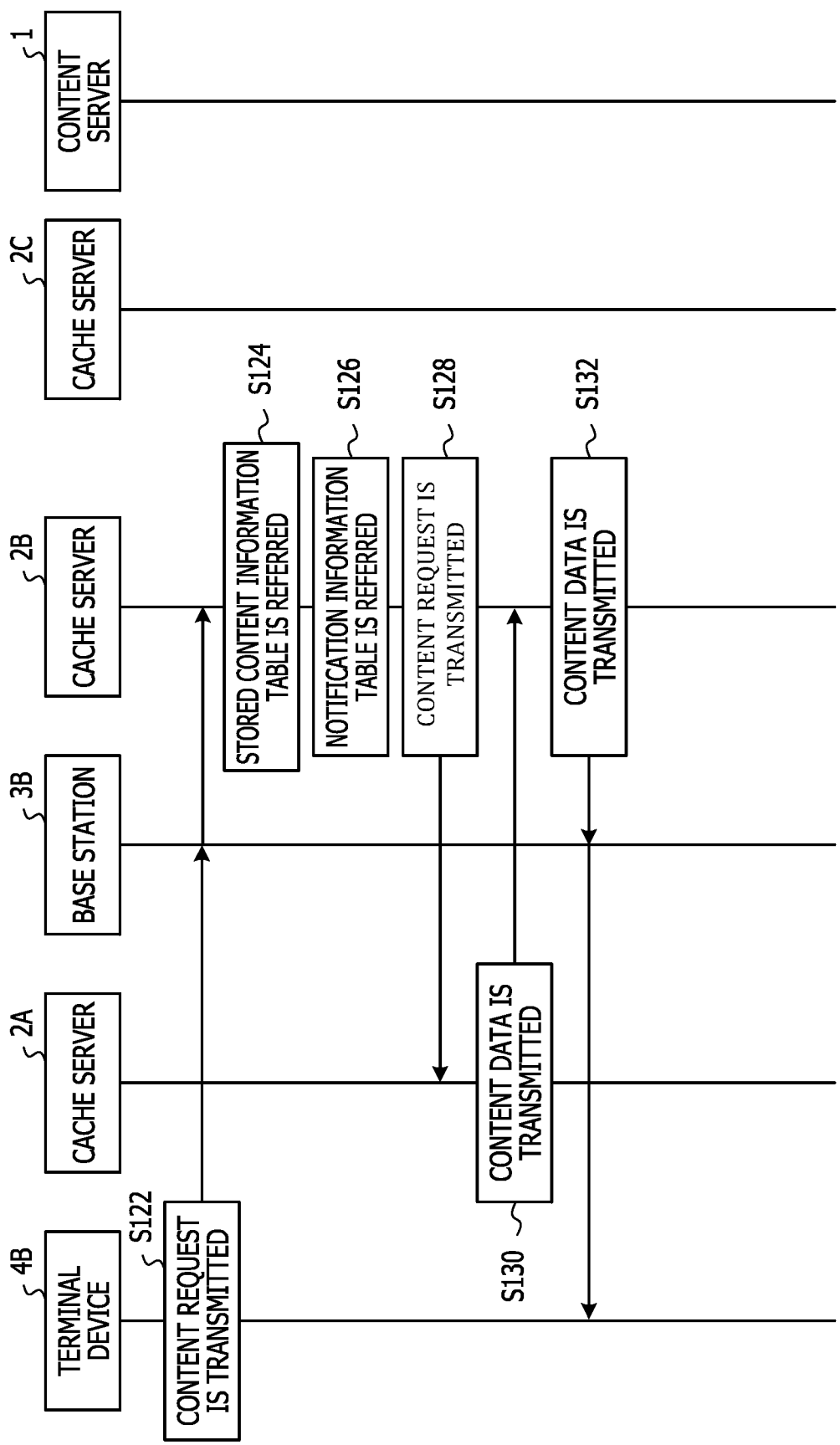
FIG. 7 is a diagram illustrating an outline of a process mainly performed between the plurality of cache servers in the first example.

FIG. 7 is a diagram illustrating an outline of a process mainly performed between the plurality of cache servers 2 in the first example. In FIG. 7, an outline of a process performed in a case where the cache server 2B that has received notification from the cache server 2A in FIG. 6 receives the content request after the reception is disclosed.

In a process S122, the terminal device 4B coupled to the base station 3B transmits the content request. It is assumed that the target content data of the content request is the same data as the content data held in the cache server 2A in FIG. 6. The content request is transmitted to the cache server 2B through the base station 3B. The cache server 2B to which the content request is received determines whether or not the content ID of the target content of request is registered in the stored content information table 217 in a process S124. In an example of FIG. 7, it is assumed that the content ID of the target content is not registered in the stored content information table 217. Next, in a process S126, the cache server 2B determines whether or not the content ID of the target content is registered in the notification information table 218. As illustrated in FIG. 6, the content ID of the target content data and the cache server ID of the cache server 2A are registered in the notification information table 218. Accordingly, the cache server 2B transmits the content request to the cache server 2A in a process S128. In this case, the information indicating the destination of the content request is rewritten to the address of the cache server 2A. In a process S130, the cache server 2A transmits the target content data to the cache server 2B based on the content request. In a process S132, the cache server 2B transmits the content data to the terminal device 4B that is an issuing source of the content request.

As described above, in processes disclosed in FIG. 6 and FIG. 7, the cache server 2A holding the content data transmitted from the content server 1 transmits the notification information to the cache server 2B. In addition, the cache server 2B to which the notification information is received transmits the content request to the cache server 2A holding the content data in a case where the content request with respect to the same content after the reception is received. With these processes, the cache server 2B can receive the content data from the cache server 2A, and can transmit the content data to the terminal device 4B. In addition, the cache server 2B can recognize whether or not the target content data is stored in the cache server 2A, by referring to the notification information table 218 of itself. Therefore, the cache server 2B can select any one of the cache server 2A and the content server 1 as a destination of the content request without performing an inquiry to the cache server 2A.

Figure 8:
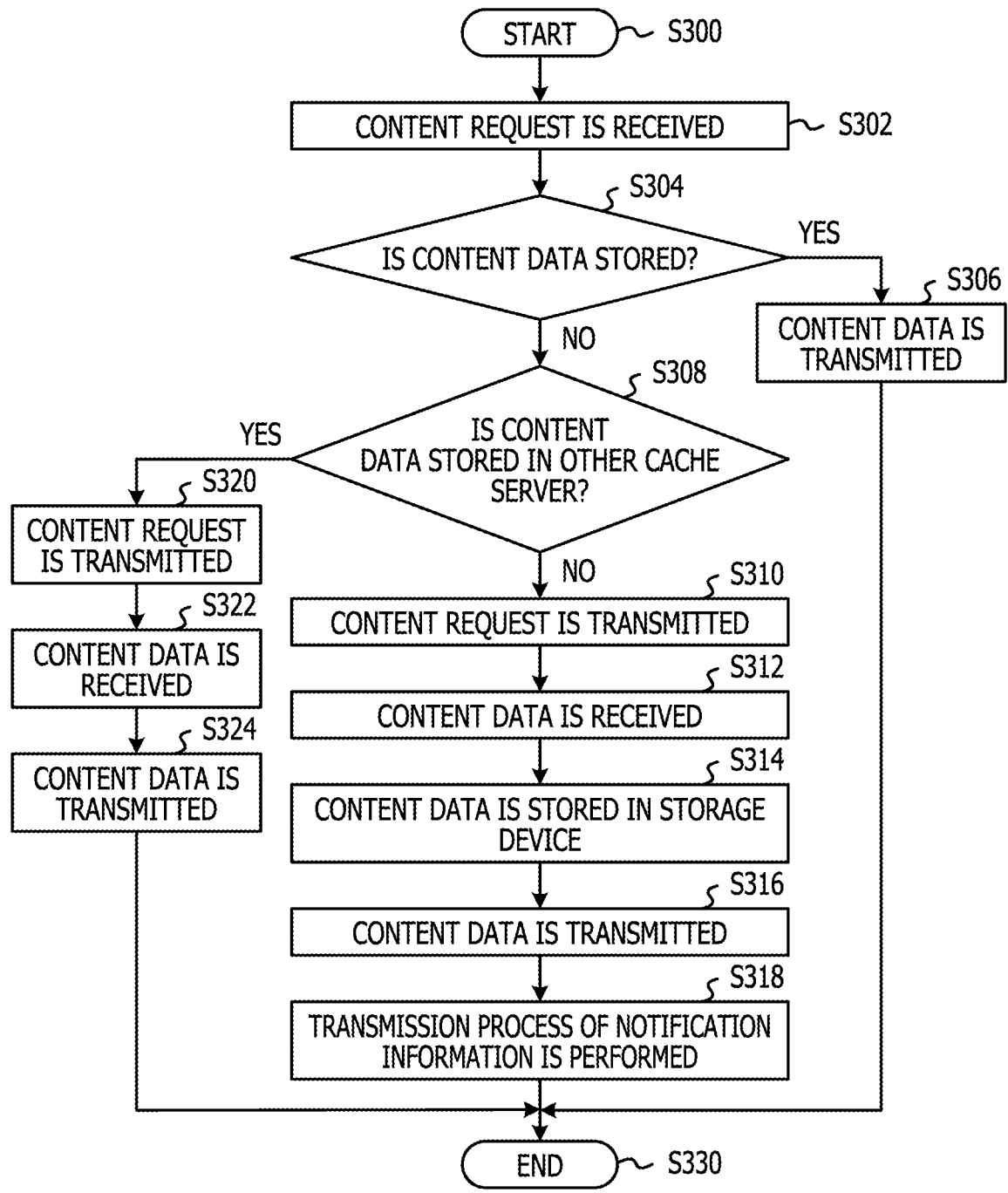
FIG. 8 is a flowchart of a process performed by a processor of the cache server in the first example.

FIG. 8 is a flowchart of a process performed by the processor 21 of the cache server 2 in the first example. A process flow is started by a process S300, and the request transmission and reception unit 212 receives the content request in a process S302. In the reception of the content request, there is also a case where the content request transmitted from other cache servers 2 is received, in addition to a case where the content request is received from the base station 3 corresponding to the cache server 2. In a process S304, the determination unit 211 determines whether or not the target content data of the content request is stored in the storage device 25 of the cache server 2 by referring to the stored content information table 217. In a case where it is determined that the target content data is stored in the storage device 25 of the cache server 2, the processing flow proceeds to a process S306. In the process S306, the content data transmission and reception unit 214 transmits the content data stored in the storage device 25. In a case where the content request is transmitted from the terminal device 4 through the base station 3 corresponding to the cache server 2, the transmission of the content data is performed with respect to the terminal device 4 through the base station 3. Meanwhile, in a case where the content request is transmitted from other cache servers 2, the transmission of the content data is performed with respect to other cache servers 2.

Meanwhile, in the process S304, in a case where it is not determined that the target content data is stored in the storage device 25 of the cache server 2, the processing flow proceeds to a process S308. In the process S308, the determination unit 211 determines whether or not the content ID of the target content is registered in the notification information table 218, that is, the target content data is stored in other cache servers 2. In a case where it is determined that the target content data is stored in other cache servers 2, the processing flow proceeds to a process S320. In a case where it is not determined that the target content data is stored in other cache servers 2, the processing flow proceeds to a process S310.

In a case where the processing flow proceeds to the process S320, in the process S320, the request transmission and reception unit 212 transmits the content request to other cache servers 2 in which the target content data is stored. Then, in a process S322, the content data transmission and reception unit 214 receives the target content data from other cache servers 2. Accordingly, in a process S324, the content data transmission and reception unit 214 transmits the target content data to the terminal device 4 through the base station 3.

Meanwhile, in a case where the processing flow proceeds from the process S308 to the process S310, in the process S310, the request transmission and reception unit 212 transmits the content request to the content server 1. Accordingly, in a process S312, the content data transmission and reception unit 214 receives the target content data from the content server 1. Accordingly, in a process S314, the storage control unit 213 stores the target content data in the storage device 25. In a process S316, the content data transmission and reception unit 214 transmits the target content data to the terminal device 4 through the base station 3. In addition, in a process S318, the notification unit 215 performs a transmission process of the notification information with respect to other cache servers 2. Then, the processing flow is completed at a process S330.

As described above, in the first example, the cache server 2A holding the content data transmits the notification information to other cache server 2, and other cache server 2 registers the received notification information in the notification information table 218. With this, other cache servers 2 refer to the notification information table 218 in a case where the content request is received, and thus it is possible to determine whether the content request is obtained from the content server 1 or obtained from the cache server 2.

Also, in the process S130 of FIG. 7 and the process S324 of FIG. 8, it is not mentioned whether or not the cache server 2B in which the content data transmitted from the cache server 2A is received stores the content data in the storage device 25 of itself. In this regard, the storage control unit 213 of the cache server 2B may further have a function of selecting whether or not to store the content data transmitted from the cache server 2A in the storage device 25 of itself. It is assumed that the cache server 2B receives the content request again with respect to the content, after storing the content data in the storage device 25 of the cache server 2B. In this case, the cache server 2B can directly transmit the content data from the storage device 25 of itself to the terminal device 4. With this, a time demanded for the terminal device 4 to obtain desired content data is shortened. In addition, in a case where the content data is not stored in the storage device 25 of the cache server 2B, it is possible to suppress that the cache server 2A and the cache server 2B hold the same content data. With this, it is possible to effectively use the amount of the storage device 25 of the plurality of cache servers 2. Also, the storage control unit 213 may store the content data in the storage device 25 without selecting whether or not to store the content data transmitted from the cache server 2A in the storage device 25 of itself.

In addition, in the first example, the cache server 2A in the process S116 of FIG. 6 and the process S320 of FIG. 8 may not transmit the notification information to all other cache servers 2. For example, the notification information may be selectively transmitted to a specific cache server 2 among the plurality of the cache servers 2. For example, in a case where another base station 3 grouped as a handover destination of the base station 3A corresponding to the cache server 2A is present, the cache server 2 corresponding to the grouped base station 3 may be selected as the transmission target of the notification information. In addition, in a case where a paging area including a plurality of base stations 3 is set so as to perform paging with respect to the terminal device 4, the cache server 2 corresponding to the base station 3 included in the paging area may be selected as the transmission target of the notification information. Another method as a selection method of the cache server 2 which becomes the transmission target of the notification information is disclosed in the following second example.

Second Example

Figure 9:
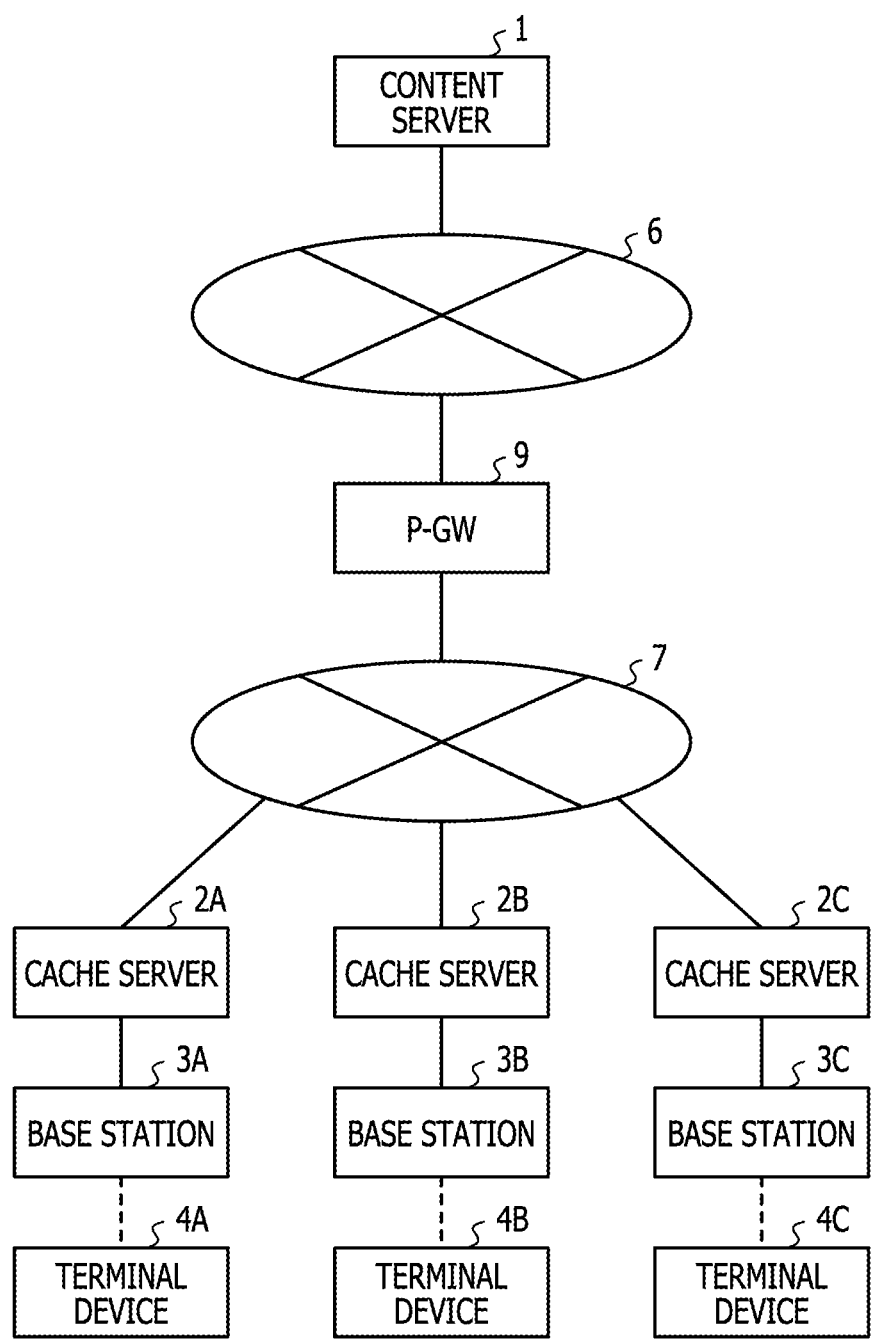
FIG. 9 is a diagram illustrating a configuration example of a network in a second example.

FIG. 9 is a diagram illustrating a configuration example of a network in a second example. The same reference numerals are assigned to the same components as those disclosed in FIG. 1, and the description thereof will be appropriately omitted. For example, a mobile network 7 provided by an internet service provider (ISP) includes a plurality of base stations 3 and the plurality of cache servers 2. The plurality of cache servers 2 included in the mobile network 7 are also called as a mobile edge computing (MEC) server. For example, the plurality of cache servers 2 are coupled to an internet 6 via a packet data network gateway (P-GW) 9 provided by the ISP. Accordingly, the plurality of cache servers 2 can be coupled to the content server 1. Also, the mobile network 7 may be provided by a communication carrier, and the base station 3 may be the base station 3 possessed by a communication carrier.

Similar to the configuration example of the network disclosed in FIG. 1, in a case where the content data received from the content server 1 is stored in the storage device 25, each cache server 2 transmits the notification information to other cache servers 2. In the second example, each cache server 2 performs a process of specifying a transmission target of the notification information. That is, in a case where whether or not the notification information is transmitted to other cache server 2 is determined for each of cache servers 2 and other cache servers 2 are determined as a notification target, the notification information is transmitted to corresponding other cache servers 2. In a case where other cache server 2 is not determined as the notification target, the transmission of the notification information to the corresponding other cache server 2 is not performed.

Here, the technical significance of determining other cache servers 2 to be the notification target will be described. For example, it is assumed that the cache server 2A holds the content data, and the notification information is transmitted to the cache server 2B. In this case, the cache server 2B transmits the content request to the cache server 2A when receiving the content request. This is an effective process in a case where it is expected to reduce a time demanded to obtain the content data when obtaining the content data from the cache server 2A rather than receiving the content data from the content server 1. However, there may be a case where a time demanded to obtain the content data from the cache server 2A is longer than a time demanded to obtain the content data from the content server 1. In this case, as a transmission destination of the content request is changed from the content server 1 to the cache server 2A, the time demanded to obtain the content data becomes longer. In order to suppress such a state, in the second example, the cache server 2A transmits the notification information to other cache servers 2 in a case where it is predicted that the time demanded to obtain the content data is shortened. By this process, it is possible to suppress the time demanded to obtain the content data to be lengthened by changing the transmission destination of the content request.

More specifically, in a case where the cache server 2A receives the content request from the content server 1, the cache server 2A specifies a time (first time) demanded for the cache server 2A to obtain the content data from the content server 1. In addition, the cache server 2A specifies a time (second time) demanded for the cache server 2A to transmit the content data to the cache server 2B. Accordingly, the cache server 2A compares the first time and the second time, and determines the cache server 2B as the transmission target of the notification information in a case where the second time shorter than the first time. Conversely, in a case where the second time is longer than the first time, the cache server 2B is determined as out of the transmission target of the notification information.

Also, the second time is individually calculated for each of the plurality of cache servers 2. This is because that a time demanded to transmit the content data from the cache server 2A to the other cache servers 2 differs depending on a bandwidth and a signal transmission delay in communication from the cache server 2A to the other cache servers 2.

In addition, the second time is individually calculated for content. This is because that the second time differs depending on the amount of the content request due to difference in the bandwidth in communication from the cache server 2A to the other cache servers 2.

Figure 10:
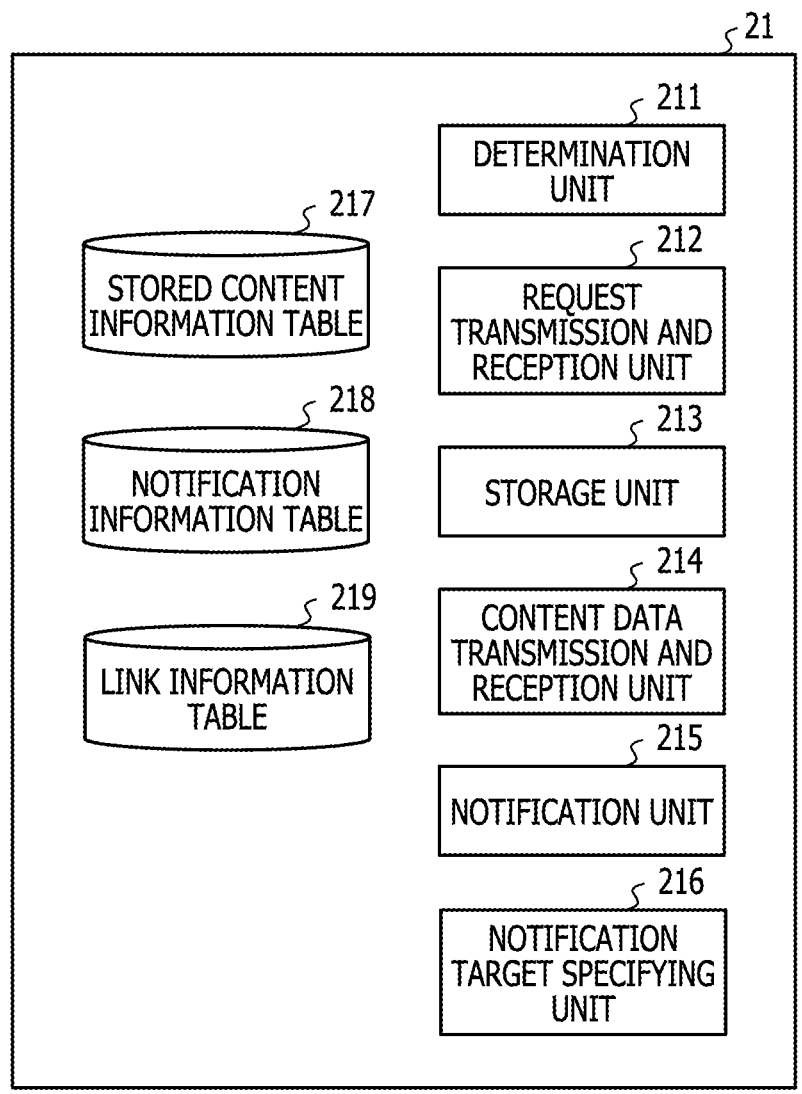
FIG. 10 is a functional block diagram of a processor of a cache server in the second example.

FIG. 10 is a functional block diagram of the processor 21 of the cache server 2 in the second example. The same functional blocks as the functional blocks disclosed in FIG. 3 are denoted by the same reference numerals, and the description thereof is appropriately omitted. The processor 21 functions as a notification target specifying unit 216 and a link information table 219, in addition to functions of the determination unit 211, the request transmission and reception unit 212, the storage control unit 213, the content data transmission and reception unit 214, the notification unit 215, the stored content information table 217, and the notification information table 218. The notification target specifying unit 216 specifies the transmission target of the notification information. The link information table 219 is a table of holding various types of information relating to communication with other cache servers 2. A content example of the link information table 219 is disclosed in FIG. 11.

FIG. 11 is a diagram illustrating an example of the link information table 219 in the second example. Information indicating a cache server ID of other cache servers 2, IP addresses of other cache servers 2, a communication bandwidth (first bandwidth) to other cache servers 2, and a signal transmission delay (first signal transmission delay) to other cache servers 2 is registered in the link information table 219. FIG. 11 illustrates an example of the link information table 219 of the cache server 2A. Respective cache server IDs "BB" and "CC" of the cache servers 2B and 2C which are other cache servers 2 are registered in the cache server 2A. In addition, respective IP addresses "xxx.xxx.x.1" and "xxx.xxx.x.2" of the cache servers 2B and 2C are registered. By using these IP addresses, the cache server 2A performs communication with the cache servers 2B and 2C through the mobile network 7. In addition, for example, "1.5 Gbps" and "800 Mbps" are registered in values of the bandwidth in communication to the cache servers 2B and 2C. In addition, for example, "0.2 ms" and "0.3 ms" are registered in values of the signal transmission delay in communication to the cache servers 2B and 2C. These values may be registered by a network manager, or a value measured by the cache server 2A transmitting the test data to another cache server 2 may be registered.

Returning to FIG. 10, the notification target specifying unit 216 specifies the time (first time) demanded to obtain the content data from the content server 1. Specifically, the notification target specifying unit 216 records the first time in which the content request is transmitted to the content server 1. In addition, the notification target specifying unit 216 records the second time in which reception of the content data from the content server 1 is completed. Accordingly, the notification target specifying unit 216 specifies a difference amount between the second time and the first time as the first time.

Furthermore, the notification target specifying unit 216 specifies the time (second time) demanded to transmit the content data to other cache servers 2. Specifically, the notification target specifying unit 216 specifies a data amount of the received content data. The data amount of the content data may be specified based on the address of the content data stored in the storage device 25, may be specified by sequentially adding the data amount of packets every time a packet including the content data is received, and, in a case where information indicating the data amount of the content data is included in the packet header or the like including the content data, may be specified based on the information.

Next, the notification target specifying unit 216 extracts a bandwidth value in communication from the cache server 2A to other cache servers 2 from the link information table 219. Accordingly, the notification target specifying unit 216 specifies the second time by adding a value of the signal transmission delay registered in the link information table 219 to a value obtained by dividing a value of the data amount of the content data by a value of a bandwidth.

Accordingly, the notification target specifying unit 216 determines whether or not the transmission of the notification information to other cache servers 2 is performed based on comparison between the first time and the second time. In a case where a plurality of other cache servers 2 are present, this determination is performed for each other cache servers 2, or performed for each content data in a case where a plurality of pieces of the content data are present.

Figure 12:
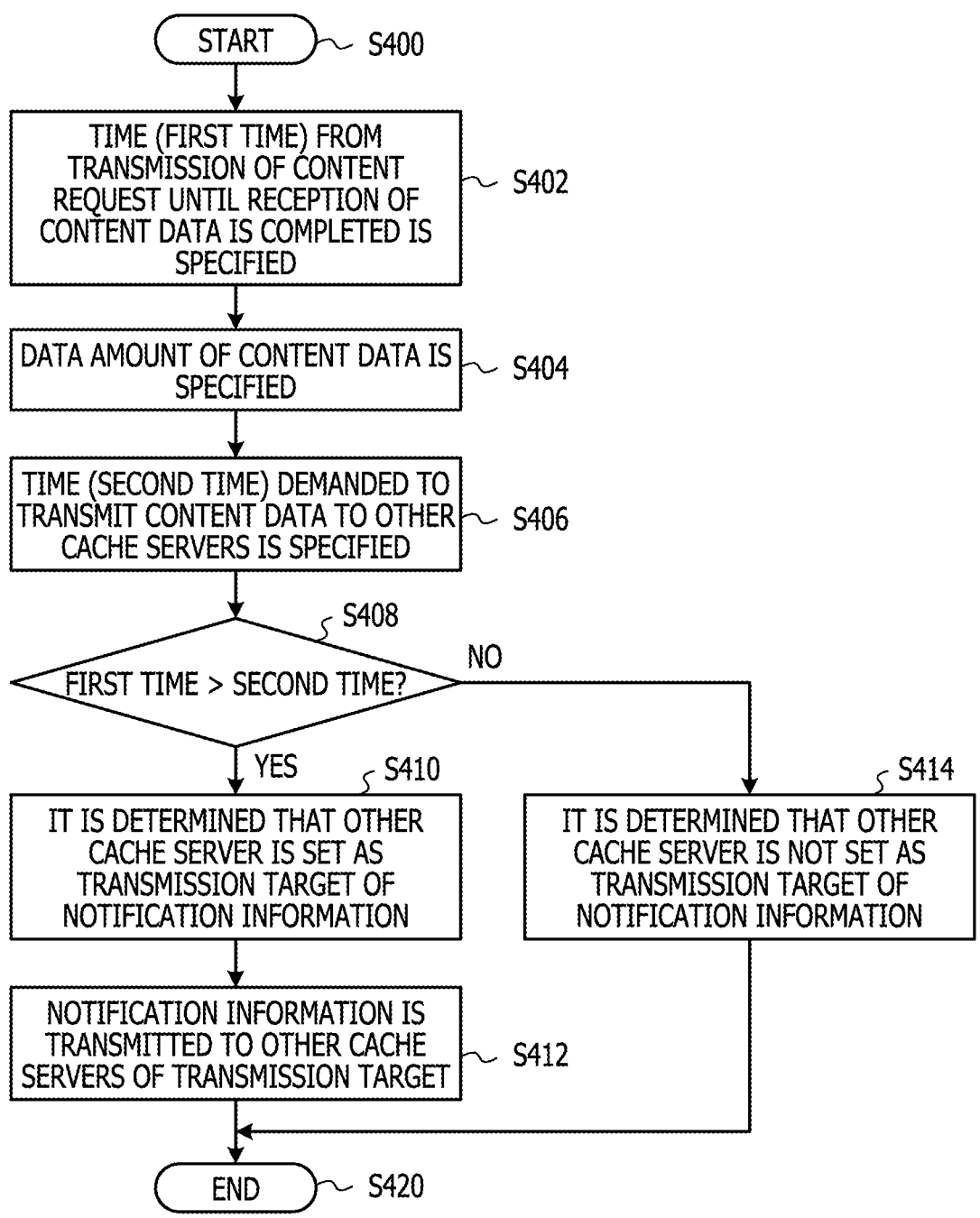
FIG. 12 is a flowchart relating to a transmission process of notification information performed by the processor of the cache server in the second example.

FIG. 12 is a flowchart relating to a transmission process of the notification information performed by the processor 21 of the cache server 2 in the second example. A series of processes illustrated in FIG. 12 correspond to the content of the process S320 disclosed in FIG. 8. The processing flow is started by a process S400, and the notification target specifying unit 216 specifies the time (first time) from the transmission of the content request until the reception of the content data is completed, in a process S402. In a process S404, the notification target specifying unit 216 specifies the data amount of the content data. In a process S406, the notification target specifying unit 216 divides a value of the data amount of the content data by a bandwidth value in communication to other cache servers 2, and further adds a value of the signal transmission delay of the communication to other cache servers 2 to the divided value. With this, the time (second time) demanded to transmit the content data to other cache servers 2 is specified. Accordingly, in a process S408, the notification target specifying unit 216 determines whether or not the first time is longer than the second time. In a case where it is determined that the second time is longer than the first time, the processing flow proceeds to a process S410, and in the process S410, the notification target specifying unit 216 determines that other cache server 2 is set as the transmission target of the notification information. Accordingly, in a process S412, the notification unit 215 transmits the notification information to other cache servers 2 determined as the transmission target of the notification information. Meanwhile, in the process S408, in a case where it is not determined that the second time is longer than the first time, the processing flow proceeds to a process S414, and in the process S414, the notification target specifying unit 216 determines that other cache server 2 is not set as the transmission target of the notification information. Then, in a process S420, the processing flow is completed.

As described above, in the second example, the cache server 2A performs a process of specifying other cache servers 2 which becomes a target to which transmission of the notification information is performed. With this, by changing transmission destination of the content request by other cache servers 2 to which the notification information is received, it is possible to suppress a situation that the time demanded to obtain the content data increases.

Also, in the second example, the second time is obtained by dividing the value of the data amount of the content data by the bandwidth value, and further adding the value of the signal transmission delay, but other method may be applied thereto. For example, in a case where the value of the signal transmission delay is a small value enough to be ignored as compared to the value obtained by dividing the value of the data amount of the content data by the bandwidth value, the value of the signal transmission delay may not be used. In addition, a processing time demanded to read data from the storage device 25 by the cache server 2 may be further considered.

Modification Example of Second Example

In the second example, it is assumed that a time demanded for the cache server 2B to obtain the content data from the content server 1 is equal to a time demanded for the cache server 2A to obtain the content data from the content server 1. Accordingly, under this assumption, it is determined whether or not the notification information is transmitted to the cache server 2B by comparing the first time and the second time. However, there is a case where the time demanded for the cache server 2B to obtain the content data from the content server 1 does not match the time demanded for the cache server 2A to obtain the content data from the content server 1. Hereinafter, this case will be described below in detail.

As disclosed in FIG. 9, each of the plurality of cache servers 2 is coupled to the content server 1 via the P-GW9. Therefore, in a communication path between the content server 1 and each cache server 2, a communication path part between the content server 1 and the P-GW9 is a common part between the plurality of cache servers 2. Meanwhile, in the communication path between the content server 1 and each cache server 2, a communication path part between the P-GW9 and each cache server 2 is a separated part in each cache server 2. Accordingly, communication bandwidths and signal transmission delay times of these communication path parts are different from each other for each cache server 2. Therefore, there is a case where a transmission time of the content data from the content server 1 to the cache server 2A and a transmission time of the content data from the content server 1 to the cache server 2B are different from each other. In a modification example of the second example, it is determined whether or not the transmission of the notification information is performed in consideration of the above-described difference of the transmission time of the content data.

In a modification example of the second example, a time (third time) demanded for the cache server 2B to obtain the content data from the content server 1 is specified. First, the cache server 2A transmits the content request to the content server 1. This content request is transmitted to the content server 1 through the P-GW9. At this time, the P-GW9 records the time (third time) at which the P-GW9 transmits the content request to the content server 1. Furthermore, the P-GW9 records a time (fourth time) at which the transmission of the content data from the content server 1 to the P-GW9 is completed. Accordingly, information indicating the third time that is a difference amount between the third time and the fourth time which are recorded is notified to the cache server 2A. In addition, the cache server 2A adds the signal transmission delay in communication between the P-GW9 and the cache server 2B, and further adds the third time notified from the P-GW9 to a value obtained by dividing the data amount of the content data by a transmission bandwidth from the P-GW9 to the cache server 2B. In a case where the cache server 2B transmits the content request to the content server 1, the value obtained in this manner corresponds to the time (fourth time) demanded for the cache server 2B to obtain the content data from the content server 1. Accordingly, in a case where the time (second time) demanded to transmit the content data from the cache server 2A to the cache server 2B is shorter than the fourth time, the cache server 2A transmits the notification information to the cache server 2B.

FIG. 13 is a diagram illustrating an example of the link information table 219 in a modification example of the second example. The link information table 219 includes information indicating a bandwidth (second bandwidth) of the communication from the P-GW9 to other cache servers 2 and information indicating the signal transmission delay (second signal transmission delay) in communication between the P-GW9 and other cache servers 2, in addition to the content illustrated in FIG. 11. The notification target specifying unit 216 specifies the cache server 2 to be the transmission target of the notification information, based on information registered in the link information table 219 and information relating to the third time notified from the P-GW9. With this, it is possible to specify the transmission target of notification information with high accuracy compared to the second example.

Also, in the first example, the second example, and the modification example thereof, an example in which the cache server 2A transmits the notification information is disclosed. However, a case where the cache server 2C transmits the notification information with respect to the same content can be considered. Accordingly, there is a case where the cache server 2B receives the notification information from both the cache servers 2A and 2C with respect to the same content. In this case, the cache server 2B may transmit the content request to either of the cache servers 2A and 2C. Alternatively, among the cache servers 2A and 2C, one of which a time demanded to receive the content data is short may be selected. The cache servers 2A and 2C notify the cache server 2B of information relating to the time (second time) demanded to transmit the content data to the cache server 2B and thus this method can be performed. Accordingly, the information relating to the second time is stored in, for example, the link information table 219 of the cache server 2B, and the cache server 2B selects any one of the cache servers 2A and 2C based on the second time, and transmits the content request.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
a first storage device;
a first information processing device coupled to the first storage device and including a first memory and a first processor coupled to the first memory; and
a second information processing device including a second memory and a second processor coupled to the second memory,
wherein the first processor is configured to perform:
receiving a first request requesting data,
transmitting the first request to a third information processing device,
receiving the data from the third information processing device,
storing the data in the first storage device, and
notifying the second information processing device of information indicating that the data is stored in the first storage device,
the second processor is configured to perform:
receiving a second request requesting the data from a device,
changing, based on the information, a destination of the second request to the first information processing device, and
transmitting the second request of which the destination is changed to the first information processing device,
the first processor is further configured to perform:
transmitting the data stored in the first storage device to the second information processing device in response to receiving the second request from the second information processing device, and
the second processor is configured to:
transmitting, to the device, the data received from the first information processing device as a response to the second request.

2. The information processing system according to claim 1,
wherein the second processor is further configured to perform:
transmitting the second request received from the device to the third information processing device when the notification is not performed by the first information processing device.

3. The information processing system according to claim 1,
wherein the first processor is further configured to perform:
determining whether to perform the notification in accordance with a data size of the data.

4. The information processing system according to claim 3,
wherein the first information processing device and the third information processing device are coupled to each other through a gateway,
the second information processing device and the third information processing device are coupled to each other through the gateway,
the first request transmitted from the first processor is transmitted to the third information processing device through the gateway,
the data transmitted from the third information processing device is input to the gateway,
the first processor is further configured to performing:
determining a difference amount between a first time at which the gateway transmits the first request received from the first information processing device to the third information processing device and a second time at which the gateway receives the data from third information processing device,
determining a third time to obtain, by the second processor, the data in a case where the second request is transmitted from the second processor to the third information processing device, based on the difference amount, the data size, a second bandwidth in communication from the gateway to the second information processing device, and the second signal transmission delay in communication between the gateway and the second information processing device, and determining a second time to transmit the data from the first processor to the second information processing device, and performing the notification when the second time is shorter than the third time.

5. The information processing system according to claim 3, further comprising:

a second storage device coupled to the second information processing device, wherein the second processor is further configured to perform:

storing the data in the second storage device when the data is received from the third information processing device, and not storing the data in the second storage device when the data is received from the first processor.

6. The information processing system according to claim 1, wherein the first processor is further configured to perform determining a first time from the transmission of the first request to the reception of the data, and a second time to transmit the data from the first processor to the second information processing device, and performing the notification when the second time is shorter than the first time.

7. The information processing system according to claim 6, wherein the second time is determined based on a data size of the data and a first bandwidth in communication from the first information processing device to the second information processing device.

8. The information processing system according to claim 7, wherein the second time is determined based on a value obtained by dividing the data size of the data by the first bandwidth and a first signal transmission delay in the communication between the first information processing device and the second information processing device.

9. A method of data transmission executed by an information processing system including a first storage device, a first information processing device coupled to the first storage device and a second information processing device, the method comprising:

receiving, by the first information processing device, a first request requesting data;

transmitting, by the first information processing device, the first request to a third information processing device;

receiving, by the first information processing device, the data from the third information processing device;

storing, by the first information processing device, the data in the first storage device;

notifying, by the first information processing device, the second information processing device of information indicating that the data is stored in the first storage device;

receiving, by the second information processing device, a second request requesting the data from a device;

changing, based on the information, by the second information processing device, a destination of the second request to the first information processing device;

transmitting, by the second information processing device, the second request of which the destination is changed to the first information processing device;

transmitting, by the first information processing device, the data stored in the first storage device to the second information processing device in response to receiving the second request from the second information processing device; and transmitting, by the second information processing device, to the device, the data received from the first information processing device as a response to the second request.

10. The method according to claim 9 further comprising:

receiving, by the second information processing device, a third request requesting other data from the device; and transmitting, by the second information processing device, the third request to the third information processing device for acquiring the other data from the third information processing device.

11. The method according to claim 9 further comprising:

determining, by the first information processing device, whether performing the notifying of the information in accordance with a data size of the data.

12. The method according to claim 11, wherein the first information processing device and the third information processing device are coupled to each other through a gateway, the second information processing device and the third information processing device are coupled to each other through the gateway, the first request transmitted from the first information processing device is transmitted to the third information processing device through the gateway, the data transmitted from the third information processing device is input to the gateway, and the method further comprises:

determining, by the first information processing device, a difference amount between a first time at which the gateway transmits the first request received from the first information processing device to the third information processing device and a second time at which the gateway receives the data from third information processing device;

determining, by the first information processing device, a third time to obtain, by the second processor, the data in a case where the second request is transmitted from the second information processing device to the third information processing device, based on the difference amount, the data size, a second bandwidth in communication from the gateway to the second information processing device, and the second signal transmission delay in communication between the gateway and the second information processing device; and determining, by the first information processing device, the second time to transmit the data from the first information processing device to the second information processing device, and the notifying is performed when the second time is shorter than the third time.

13. The method according to claim 11, wherein the information processing system further includes a second storage device coupled to the second information processing device, and the method further comprises:

storing, by the first information processing device, the data in the second storage device when the data is received from the third information processing device; and not storing, by the first information processing device, the data in the second storage device when the data is received from the first information processing device.

14. The method according to claim 9 further comprising:

determining, by the first information processing device, a first time from the transmission of the first request to the reception of the data, and a second time to transmit the data from the first information processing device to the second information processing device, wherein the notifying is performed, when the second time is shorter than the first time.

15. The method according to claim 14, wherein:

the second time is determined based on a data size of the data and a first bandwidth in communication from the first information processing device to the second information processing device.

16. The method according to claim 15, wherein the second time is determined based on a value obtained by dividing the data size of the data by the first bandwidth and a first signal transmission delay in the communication between the first information processing device and the second information processing device.

17. An information processing device configured to be coupled to a storage device, the information processing device comprising:

a memory; and a processor coupled to the memory and configured to perform:

receiving a first request requesting data, transmitting the first request to a third information processing device, receiving of the data from the third information processing device, storing the data in the first storage device, notifying another information processing device of information indicating that the data is stored in the first storage device, and when the another information processing device transmits another request requesting the data based on the information, transmitting the data stored in the first storage device to the another information processing device in response to receiving the another request from the another information processing device.

18. The information processing device according to claim 17, wherein the processor is further configured to perform:

determining whether to perform the notification in accordance with a data size of the data.

19. The information processing device according to claim 17, wherein the processor is further configured to perform:

determining a first time from the transmission of the first request to the reception of the data, and a second time to transmit the data from the processor to the another information processing device, and notifying when the second time is shorter than the first time.

20. The information processing device according to claim 19, wherein the second time is determined based on a data size of the data and a first bandwidth in communication from the information processing device to the another information processing device.

* * * * *